April 23, 1968 W. R. HARRY ET AL 3,379,221
UNDERGROUND CONDUIT
Filed Dec. 28, 1965 4 Sheets-Sheet 1

INVENTORS
WILLIAM R. HARRY
LLOYD EWING
RALMOND J. SMILTNEEK
BY Wheeler, Wheeler & Wheeler
ATTORNEYS 3,379,221
UNDERGROUND CONDUIT
William R. Harry, Hartland, Lloyd Ewing, Milwaukee, and Ralmond J. Smiltneek, Butler, Wis., assignors, by mesne assignments, of one-half to Ashland Oil & Refining Company, a corporation of Kentucky, and one-half to Armco Steel Corporation, a corporation of Ohio
Continuation-in-part of applications Ser. No. 237,083, Nov. 13, 1962, Ser. No. 308,393, Sept. 12, 1963, and Ser. No. 475,223, July 27, 1965. This application Dec. 28, 1965, Ser. No. 525,905
20 Claims. (Cl. 138—143)

ABSTRACT OF THE DISCLOSURE

The application discloses conduit especially adapted for underground use. The conduit is formed of concentric tubes of synthetic resinous material of specified flexural modulus, connected by spacing and bracing means which act in compression or in tension, rather than in mere resistance to flexing, to secure the concentric tubes against radial and angular displacement relative to one another. The conduit is formed in such manner that it exhibits the property of having a stiffness within a specified range, and this property, acting in concert with the particular structure and specified material of construction enables the conduit manufacturer to produce a corrosion-proof conduit having substantial longitudinal flexibility, improved crushing strength and adaptability to a wide variety of installation conditions, while making efficient use of the material of construction.

RELATED APPLICATIONS

This application includes subject matter which is common to it and to earlier copending applications of the same inventors, including Ser. No. 475,223, filed July 27, 1965, Ser. No. 308,393, filed Sept. 12, 1963, and Ser. No. 237,083, filed Nov. 13, 1962, all of which are now abandoned. This application is a continuation-in-part of these three applications.

BACKGROUND OF THE INVENTION

1. *Field of the invention*

This invention relates to conduit especially adapted for underground use. More particularly, it relates to conduit capable of withstanding transverse crushing force and deflection stresses such as those encountered in underground use.

2. *Description of the prior art*

The various known types of pipe or conduit that have heretofore been used or suggested for underground applications are subject to various disadvantages. For instance, there is the familiar corrugated steel pipe which is liable to fail as a result of corrosion, and which, because of the irregular shape of its interior walls, does not have very good hydraulic flow characteristics. Also, there are the well-known rigid concrete, vitrified clay and cast iron pipes which are unable to conform very well to longitudinal uneveness in the bottoms of the trenches in which they are buried, with the result that if special and expensive bedding techniques are not employed, they must be laid in relatively short lengths, thus increasing the number of sections to be handled and the number of joints between sections to be sealed or to cause leaks in a given installation. Then, there are relatively flexible conduits extruded from synthetic polymer materials which, when buried at depths substantially exceeding about 4 feet, may be liable to collapse under soil loads unless very elaborate and costly installation practices are followed or the wall thickness of the pipe is greatly increased, thus adding considerably to the cost of the pipe itself. Then again, there are the "wrapped" pipes which, although offering considerable bursting resistance, are unduly complicated in their manufacture, by virtue of the fact that they are produced by winding two separate tubes of different diameter from tape impregnated with catalyzed, liquid synthetic resin, followed by bonding of the two tubes together in concentric relationship with still another tube or with a filler, which latter tube or filler is held between the first two tubes and may also have been constructed by wrapping or winding. It appears therefore that a need remains for improved conduit which is not subject to the above disadvantages.

OBJECTS

The principal object of the present invention is to fulfill the above need. Still another object is to provide underground corrosion-proof conduit suitable for installation in relatively long lengths and which, nevertheless, is still able to conform adequately and without failure to longitudinal uneveness in the bottoms of the trenches in which such conduit it buried. Yet another object of the invention is to provide underground conduit for burial at depths substantially in excess of four feet without special compaction of backfill. Another object is to provide improvements in underground conduit construction for employing a given amount of raw material to much greater advantage than has heretofore been possible. Another object of the invention is to provide underground conduit which may be produced by simple extrusion and filling techniques. These and other objects of the invention will become apparent to a person skilled in the art upon careful consideration of the disclosure of the intion which follows.

SUMMARY OF THE INVENTION

The underground conduit of the present invention comprises generally concentric tubes, substantially circular in cross-section, of synthetic resinous material, having spacing and bracing means between the tubes. The spacing and bracing means connect the tubes with one another and secure them against radial and angular displacement relative to one another. The spacing and bracing means should act in compression or in tension, rather than in resistance to flexing only. The angular displacement referred to is not merely bodily displacement of the tubes relative to each other but is also the localized displacement occurring incident to transverse deflection.

In a preferred arrangement, the inner and outer tubes of the underground conduit of this invention are integrally provided with generally longitudinal spacing webs disposed at circumferentially spaced intervals between the tubes and at least some of which are alternately inclined in opposite directions for the desired bracing effect. Preferably these extend rectilinearly between the lines upon which they are connected with the respective tubes. It is to be noted that in the preferred construction, the oppositely inclined relationship of the webs together with the integral connection with the tubes is the factor which provides resistance to angular displacement. This resistance augments and contributes to the resistance to radial distortion under transverse loads.

The underground conduit as a whole, including the concentric tubes and spacing and bracing means as assembled in the completed conduit, has as one of its vital properties, a specified stiffness falling within a critical range of stiffness values. Conduit constructed in accordance with the invention, having the property of stiffness within the aforesaid critical range has a number of valuable advantages which have proved surprising to persons closely familiar with the techniques and problems of underground construction. Before considering these advantages, it is believed important to stress the distinctions between the strength and stiffness properties of conduit.

DISCUSSION OF TERMS AND TECHNICAL CONSIDERATIONS RELATING TO DEFINITION OF THE INVENTION AND ITS ADVANTAGES

The strength of a conduit is the maximum load each linear inch or other unit of length of conduit can bear without failure. Failure may be structural, i.e. development of materially injurious cracks in the conduit structure while loaded, or it may occur when deflection, i.e. vertical reduction of conduit diameter under external load, exceeds proper limits. Conduit strength may be measured in the laboratory by compressing a length of conduit between parallel plates under increased load until failure occurs. Convenient units for defining strength are pounds of compressive force per inch of conduit length or pounds per inch. Strength may also be defined as pounds of compressive force per inch of length per inch of undeflected conduit diameter, or pounds per inch per inch.

The stiffness of a conduit is its property of resistance against deflection, i.e. vertical reduction in diameter under external load. Heretofore, we have employed the term "rigidity" in describing this property, but it is now believed that "stiffness" is more apt, since it does not leave the impression that the conduit of the invention is "rigid," as that term is understood in the conduit art. Conduit stiffness may be measured by deflecting a conduit to an extent less than that required to cause failure thereof by compressing it between parallel plates. The force exerted upon each unit of conduit length through the plates is determined. While under equilibrium conditions, the conduit resists the load imposed on it with an internally developed force that is equal in magnitude and opposite in direction. The resisting force of the conduit varies with the deflection and is, therefore, expressed as the resisting force with which each unit of conduit length is able to oppose a unit of deflection. Convenient units for expressing the property of stiffness are pounds of force per inch of conduit length per inch of deflection, or pounds per inch per inch.

The conduit of the present invention has a stiffness of a mean value of about 250 pounds per inch per inch and not less than about one fourth nor more than about four times said value. That is, the optimum mean value of the stiffness of the conduit of the present invention is about 250 pounds per inch per inch; however, conduit in accordance with the invention may have a stiffness in the range of about one fourth to four times said mean value. In other words, the mean value of the stiffness of the conduit of the invention may vary from about 60 to about 1,000 pounds per inch per inch. A preferred range of stiffness is about 125 to about 500 pounds per inch per inch, and a particularly preferred range thereof is about 200 to about 350 pounds per inch per inch.

By way of comparison we calculate that, for example, in the 8" diameter size the stiffness "S" (in lbs./in./in.) of some of the older rigid kinds of conduit would be as follows:

| | S (approx.) |
|---|---|
| Standard strength clay sewer pipe | 7900 |
| Concrete sewer pipe ASTM C14-52 | 8450 |
| Cement asbestos sewer pipe Class 1500 | 2120 |
| Extra heavy cast iron sewer pipe | 3020 |

While for a conventional flexible thermoplastic sewer pipe in the 8" size

| | S (approx.) |
|---|---|
| Styrene-rubber plastic sewer pipe CS228-61 | 21.4 |

The critical stiffness of our conduit causes it to interact with the earth in which it is buried in quite a different manner than do the more rigid conduits known to the prior art. When a conduit is buried at moderate depth in a trench having a width apreciably greater than the conduit diameter, the fill at the sides and over the conduit will be compacted and will move downwardly under the weight of the backfill above it. A rigid conduit, such as concrete, cast iron or vitrified clay conduit, will flatten very little under the crushing load, while the backfilled earth on each side of the conduit will be compacted and will settle more than the top of the conduit will deflect. This creates downward frictional forces and shearing stresses in the backfill material above and to either side of the conduit in a manner that results in a load on the conduit greater than the weight of the projected column of earth above it.

The stiffness of the conduit of this invention is such that, under conditions identical to those described above, it will deflect not only as the backfill load is placed, but also as settling occurs, resulting in a decrease in vertical diameter of the conduit. When this decrease is just equal to the compaction and settling of the fill at each side of the conduit, the frictional forces and shearing stresses in the fill above it will be negligible and the load imposed on the conduit will be equal to the projected column of soil directly above it. If the deflection is greater than the settling of the side-fill, the friction and shearing forces are in a direction which causes the fill beside the conduit to support a portion of the weight of the projected column of earth above the conduit, which further reduces the load imposed on the conduit.

Under a wide variety of installation conditions, the conduit of the invention will deflect to a sufficient extent, in comparison to the extent of settling and compaction of the soil, that it is able to "duck out from under" a portion of the soil load which cannot be escaped by rigid conduit. Thus, conduit in accordance with the invention may be used without failure under a depth of soil cover which would cause a rigid conduit of equal laboratory crushing strength to fail.

The controlled deflection of the conduit of the invention has another beneficial aspect. To the extent that its vertical diameter is reduced, there is a corresponding and approximately equal increase in the horizontal diameter. As the horizontal diameter increases, the side walls of the conduit move outwardly against the soil alongside them, compressing it. The soil resists this outward movement and in so doing generates force directed inwardly against the sides of the conduit. These forces act to nullify, at least in part, the bending stresses in the conduit wall induced by the vertical load.

Rigid pipes, such as those made of concrete and burned clay, deform very little under vertical load. Consequently, the sides do not move outwardly enough to develop any appreciable amount of passive resistance pressure in the soil, at least not until after the pipe has cracked or broken. For these materials, the only lateral pressure from the soil that can be safely depended upon to augment the load-carrying ability of the pipe is the active lateral pressure of the soil. This is generally quite small.

Thus, because the conduit of the invention can and does deflect, without failure, by an amount sufficient to develop appreciable passive lateral resistance in the soil alongside, a substantial portion of the bending stresses in the conduit wall, due to the vertical load, will be nullified. This results in appreciably lower stresses in the pipe wall than in the case of a rigid conduit of equal strength under an equivalent vertical load.

Most of the flexible conduits heretofore available, as exemplified by the styrene-rubber plastic sewer pipe identified above, deflect well beyond acceptable design limits prior to structural failure. For this reason such conduits fail to employ the synthetic resinous material of which they are constructed to their fullest advantage. A conduit which is so flexible as to fail by deflection when only a relatively small portion of the fiber strength of the material in the conduit walls is being drawn upon, takes advantage of an undesirably small portion of the intrinsic strength of the material. In the conduit of this invention, more of the potential strength of the synthetic resinous wall material is drawn upon before the conduit fails. The stiffness of the conduit of this invention causes a substantially larger portion of the fiber strength of resinous conduit wall material to come into play before the conduit walls become unstable and fail through excessive deflection. Thus, in underground environments, the conduit of the present invention is able to outperform flexible prior art conduits containing the same amount of resinous wall material.

Prior to the advent of the conduit of the present invention, the conditions inhering a proposed underground pipe installation, especially soil conditions, frequently dictated the use of flexible tubing, as examplified by rubber or plastic single-walled tubing and sheet-metal culvert pipe; or rigid pipe, exemplified by clay, concrete and cast-iron pipes, fabricated in extremely short lengths for accommodation of longitudinal variations in the depth and settling tendencies of the burial trench. Some of the types of installations mentioned above can only be made with probability of success when certain time and labor-consuming precautions are taken when preparing the burial trench and when filling it up after the conduit has been put in place. In practice, it has frequently proven difficult or impossible to properly impress the importance of these precautions upon construction workers. Those who have not closely studied underground construction have been surprised not only at the wide range of adaptability of the resinous conduit of the present invention, but also at the ability of the conduit to perform satisfactorily under a wide range of conditions without all of the installation precautions that have heretofore been necessary with previously known types of synthetic resinous conduits, particularly when buried at substantial depths.

An outstanding feature of the conduit of the present invention is that it combines substantial longitudinal flexibility, for accommodating longitudinal variations in trench depth, with high resistance to failures arising out of excessive deflection and/or structural fracture produced by heavy earth loads. While there are certain small diameter corrugated metal pipes that have combined flexibility and strength, experts familiar with underground construction have been surprised that both substantial longitudinal flexibility and great crushing strength can be achieved in the corrosion-proof, widely adaptable conduit of the present invention.

From the above discussion, it will be apparent that there is an optimum level of stiffness at which the conduit of the present invention will develop a maximum of support from the passive resistance in the soil and will also relieve itself of as much as possible of the soil load, by "ducking out from under" it, without however deflecting to the extent that the conduit wall becomes unstable. A particularly important advantage of the present invention is that is overcomes a serious obstacle to the economic construction of conduit of optimum stiffness in a variety of strength classifications. Since the cost of conduit is directly influenced by its strength, it is desirable to make underground conduit in a variety of strength classifications so that it is not necessary to use unduly strong (and therefore costly) conduit in an installation in which less costly conduit will serve satisfactorily. Heretofore, the most commonly used underground conduits have been of single-wall construction, in which the wall structure is of the same material throughout its entire thickness, except perhaps for a thin, corrosion-proofing surface coating that contributes negligible strength. The most common expedient for producing such conduit in varying strengths is to provide them with walls of varying thickness. It can be shown, however, that single-wall conduit has only one level of strength at which it will have optimum stiffness. This is all well and good if that particular strength level is well suited for a given installation, but what is to be done when other strength levels are needed or desired?

The obvious solution would seem to be to adopt a different material of construction for each different strength level of conduit. In theory, at least, it would seem that a variety of materials could be carefully selected with reference to their physical properties, so that each, when fabricated into conduit of optimum stiffness, would impart substantially different strengths to the respective conduits. Although such solution is appealingly simple from a theoretical point of view, it is subject to a number of practical disadvantages.

First of all, the proposed solution is restrictive. If one wishes to produce conduit of a specific strength, he can do so only if a material can be found which has the proper combination of physical properties to yield optimum stiffness at the desired strength level. It would be purely accidental, of course, if such a material happened to exist. In some cases such a material might exist; in others it might not. Thus, the conduit fabricator might find it necessary to settle for either more or less stiffness or strength than desired, unless he happened to hit upon just the right material, and that material also possessed all the other attributes needed to make it a commercially and technically feasible material of construction, i.e., cost, ease of fabrication, impact resistance and so forth.

Secondly, the proposed solution is expensive. A manufacturer wishing to produce a line of conduit of varying strength, all of which were of optimum stiffness for average soil conditions, would still be faced with formidable production and economic disadvantages. The necessity of switching from one material or set of materials to another in order to provide conduits of differing strength would bring into play a variety of different conduit-forming techniques and apparatus, not to mention personnel skills, testing problems, as well as the need to maintain an inventory of different materials. Such multiplication of techniques, apparatus, skills, testing problems and inventories would considerably increase the manufacturing cost and therefore the selling price of such a line of conduit, thus presenting a serious obstacle to its commercialization and the practical utilization of its technological benefits. This problem has been solved by the present invention for it not only provides conduit of a preselected, critical rigidity, thus exhibiting unexpectedly good performance in underground applications, but also provides such conduit in a form in which it may be produced in varying strengths with the utmost of convenience from the same materials of construction.

BRIEF DESCRIPTION OF THE DRAWINGS

Certain preferred and illustrative embodiments will now be described in conjunction with the accompanying drawings, in which like reference numerals are employed in various views to identify like parts, and in which:

FIGURE 13 is a view similar to FIGURE 12 showing the performance of our improved double walled conduit at a level of strength different from that upon which FIGURE 12 is based.

DESCRIPTION OF THE PREFERRED EMBODIMENTS

There is a first class of embodiments of the invention in which the spacing and bracing means comprises a plurality of webs distributed between and connected with each of the tubes forming the inner and outer walls of the conduit, said webs extending longitudinally between the tubes and being alternately inclined from the radial in a truss-like arrangement. They are illustrated in FIGURES 1 through 6.

Figure 1:
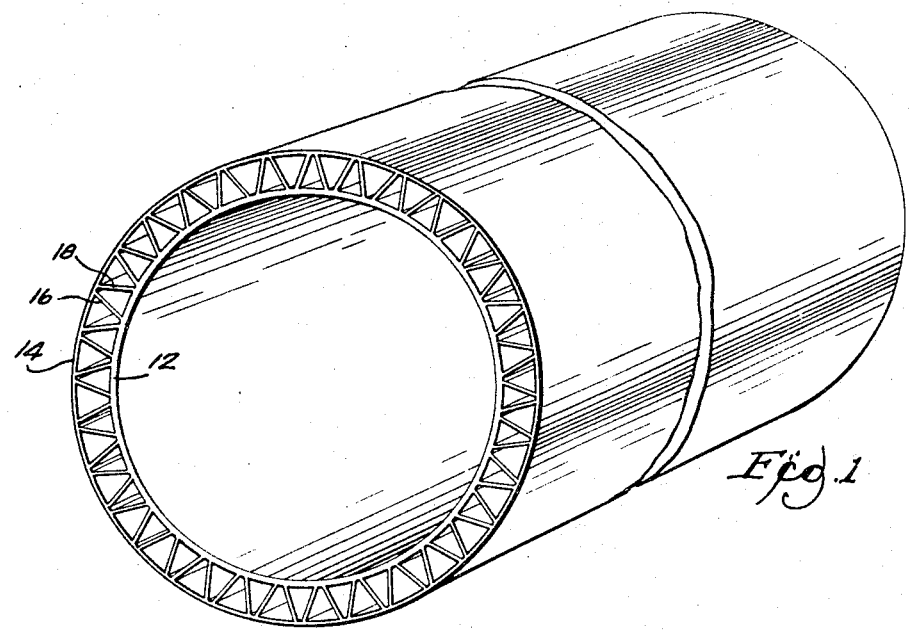
FIGURE 1 is a view in perspective, fragmentarily illustrating a preferred conduit construction embodying the invention, the intermediate portions of the conduit being broken away.

In the construction of FIGURE 1, the inner wall 12 and the outer wall 14 comprise radially spaced concentric tubes having continuous and unbroken inner and outer perimeters respectively. This is true in all of the preferred embodiments of the invention and for convenience the inner and outer walls may be referred to as peripherally continuous whether they are truly circular in cross section and uniform in thickness, as shown in FIGURE 1, or whethery they are ribbed, as shown in FIGURE 2, or polygonal, as suggested in FIGURE 4, or are shaped to have non-uniform cross-sectional thickness, as shown in FIGURE 5.

In the FIGURE 1 embodiment, the paired zigzag webs 16 and 18 provide both the radial spacing and the diagonal bracing. Webs 16 are inclined clockwise from the inner wall 12 as viewed in FIGURE 1, and webs 18 are inclined counterclockwise. Both sets of webs extend longitudinally for the full length of the conduit and both are integrally connected with the inner wall 12 and the outer wall 14 and are close to connection with each other as they extend in zigzag pattern between the tubes.

Figure 2:
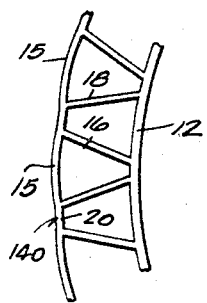
FIGURE 2 is a fragmentary detail view showing in end elevation a modified truss-reinforced conduit embodying the invention.

In the construction shown in FIGURE 2, the form of the inner wall 12 and outer wall 140 might be identical with those of FIGURE 1, but as shown, the outer tube 140 comprises arcuate convex ribs 15 between the lines on which the webs 16, 18 are connected therewith. The webs 16 and 18 are neither joined with each other nor are they in immediate proximity at their juncture with the inner wall 12, but rather they are relatively widely spaced to leave an intervening wall portion 20 between the lines at which the webs meet, and are connected with, the outer wall 140.

Figure 3:
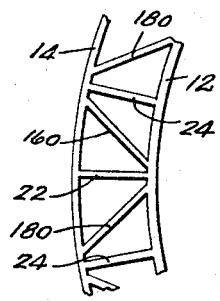
FIGURE 3 is a fragmentary detail view showing in end elevation a further modified embodiment of the invention.

In the construction of FIGURE 3, the inner and outer walls 12 and 14 are joined by radial webs 22 and 24. The former connect to the inner wall at the juncture between the webs 160 having clockwise inclination and the webs 180 having counterclockwise inclination. There are no diagonal brace webs engaged with the outer wall 14 on the lines where radial webs 22 are connected therewith.

Figure 4:
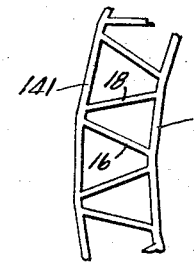
FIGURE 4 is a fragmentary detail view showing in end elevation another modified embodiment of the invention.
Figure 5:
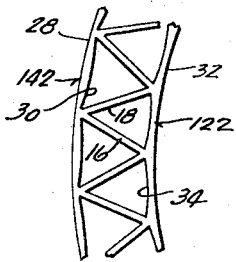
FIGURE 5 is a fragmentary detail view showing in end elevation another modified embodiment of the invention.

In the construction shown in FIGURE 4, the inner wall 121 and the outer wall 141 are both polygonal. The truss webs 16 and 18 are like those of FIGURE 1. Broadly, it is immaterial how many chord-like segments are used to constitute the inner wall 121 and the outer wall 141.

In the construction shown in FIGURE 5, the truss webs or struts 16 and 18 are again comparable to those of FIGURE 1. The outer wall 142 has a circular outer periphery 28 but its inner periphery is formed in an inwardly convex arc at 30 between each of the lines where the truss webs 16, 18 are connected therewith. The inner wall 122 has a circular inner periphery at 32, but has arcuately concave surfaces at 34 between the lines of connection of the truss webs 16 and 18 therewith.

Figure 6:
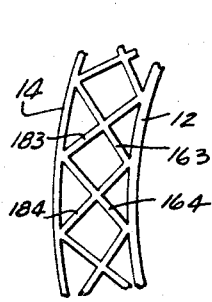
FIGURE 6 is a fragmentary detail view showing in end elevation another modified embodiment of the invention.

In the embodiment shown in FIGURE 6, the inner and outer tubes 12 and 14 are like those of FIGURE 1. The truss webs 163 and 184 are similar to those shown at 16 and 18 in FIGURE 1 except that their inclination clockwise and counterclockwise is at a greater angle toward tangency respecting the inner tube and the resulting increase in spacing of their connections with inner and outer tubes is made up by the addition of a second set of intersecting webs at 164 and 183 which are integrally connected with webs 163 and 184 at the lines of intersection and are integrally connected with the inner and outer tubes in the manner in which webs 163 and 184 are connected therewith.

The convexity and concavity or other form of the surfaces 30 and 34 of the inner and outer walls may be interchanged or varied as desired, it being our purpose to demonstrate the fact that is is unnecessary that the inner and outer walls be of uniform shape or thickness.

The above-described embodiments may be produced conveniently by extrusion as unitary assemblies, the webs and tubular members being integrally formed of synthetic resinous material. In recent times a number of synthetic resinous materials have come into use and have been fabricated into conduit for various uses. These synthetic resinous materials fall into two classes: first, thermoplastics of which polypropylene, polystyrene, polyvinylchloride, acrylonitrile-butadiene-styrene (commonly referred to as ABS) are examples; second, thermoset plastics of which phenol-formaldehyde, polyester and epoxy resins are examples. These materials have been formulated in various ways and may be combined with fillers of many sorts such as clay, ground mica, coal dust and others; or they may be reinforced with either organic or inorganic fibers such as cellulose fibers, asbestos fibers, or fibrous glass.

In virtually all cases, except perhaps when very high percentages of certain mineral fillers or fibers are used, these materials are considered as relatively flexible; that is, they have modulus of elasticity in flexure values which generally range from 50,000 lbs./in.$^2$ to 2,000,000 lbs./in.$^2$. This compares with common materials generally considered rigid, such as steel, concrete, cast iron, vitrified clay and the like, which have flexural modulus of elasticity values generally between 2,000,000 and 30,000,000 lbs./in.$^2$. On the other hand, the synthetic resinous materials described above are not to be confused with the elastomeric materials, such as rubber, both natural and synthetic, or plasticized polyvinylchloride which commonly have modulus of elasticity values of less than 10,000 lbs./in.$^2$, nor should they be confused with the semielastic materials, such as low and medium density polyethylene, which have modulus values between 10,000 and 50,000 lbs./in.$^2$.

Although the alternately inclined webs of the above embodiments are fully capable of performing a spacing and bracing function by themselves, it is highly advantageous that they be assisted in this function by a filler which substantially entirely fills the spaces between the webs. The webs ordinarily will have significantly greater strength in compression than in flexure and the presence of a proper filler bolsters the webs against flexing and therefore causes them to perform their spacing and bracing function with greater effectiveness. In order to perform in the intended manner, the filler must have substantial compressive strength. Therefore, mere loosely packed fibers, such as are used in fiberglass or asbestos heat insulation, are not suitable. Nor are flexible foamed resins suitable. However, porous fillers of relatively rigid foamed resin or concrete are quite suitable.

There is a second class of embodiments of this invention in which the filler is an essential part of the spacing and bracing means. They are illustrated in FIGURES 7 and 8 in which the inner and outer walls and webs comprise extruded synthetic resinous material as in the embodiments of FIGURES 1 through 6.

Figures 7, 8:
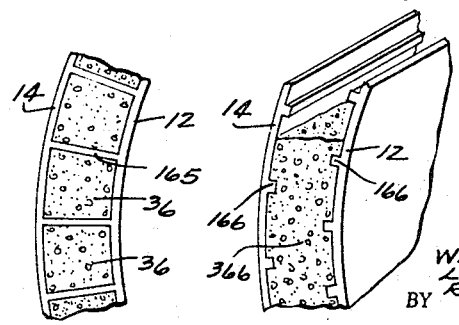
FIGURE 7 is a fragmentary detail view showing in end elevation another modified embodiment of the invention.
FIGURE 8 is a fragmentary detail view showing in end elevation another modified embodiment of the invention.

In the embodiment shown in FIGURE 7, the inner and outer walls 12 and 14 may correspond substantially with those shown in FIGURE 1, but the webs 165 are radial rather than having either clockwise or counterclockwise inclination. In the construction of this embodiment, bracing is provided by masses of filler 36 which substantially completely fill the spaces between the inner and outer walls and the radial webs 165, preferably adhering to the surfaces of the webs as well as the walls. The filler is preferably low-cost porous and/or lightweight material and may be a cementitious material, such as concrete. This is practicable because tensile stresses are imposed on the inner and outer tubes. Being engaged with all surfaces of the tubes and webs, and being at least relatively rigid in and of itself, the filling material 36 contributes markedly to the strength of the composite structure, providing bracing resistance to deflection of the walls as well as the webs.

The embodiment of FIGURE 8 shows only fragmentary radial struts or webs 166 protruding from both walls and relies upon the mass of filler at 366 to provide not only radial compressive strength but also spacing and bracing between the inner and outer walls 12 and 14.

In the embodiments of FIGURES 7 and 8, it is essential that the filler be of substantital compressive strength. However, it must also be of lower unit strength and elastic modulus than the material of the inner and outer walls, preferably less than 50% as great. In these embodiments, the inner and outer walls must constitute the basic structural elements, with the filler serving to maintain their positional relationship and to distribute stresses between them. If the above strength and modulus requirements are not observed, the filler tends to become incapable of acting as a true bracing means because it will no longer transmit stress from one wall to the other, but rather will absorb a predominant portion of any applied load itself. Thus, these embodiments are to be very carefully distinguished, for example, from conventional concrete pipe having surface coatings or layers of synthetic resin and those types of pipe which comprise a very high strength tube of synthetic resinous material having its inner and outer surfaces protected by an adherent layer of lower strength synthetic resinous material.

The double-walled conduit of the present invention may be provided with an inner wall that is thicker than the outer wall thereof. This feature provides the unobvious advantage of a conduit of greater strength than a conduit having walls of the same thickness but whose total wall thickness is the same. This embodiment of the invention takes advantage of the fact that many of the synthetic resinous materials suitable as materials of construction for the conduit of the present invention have a greater ultimate strength in compression than in tension. This embodiment of the invention is described in connection with FIGURES 9-11.

Figure 9:
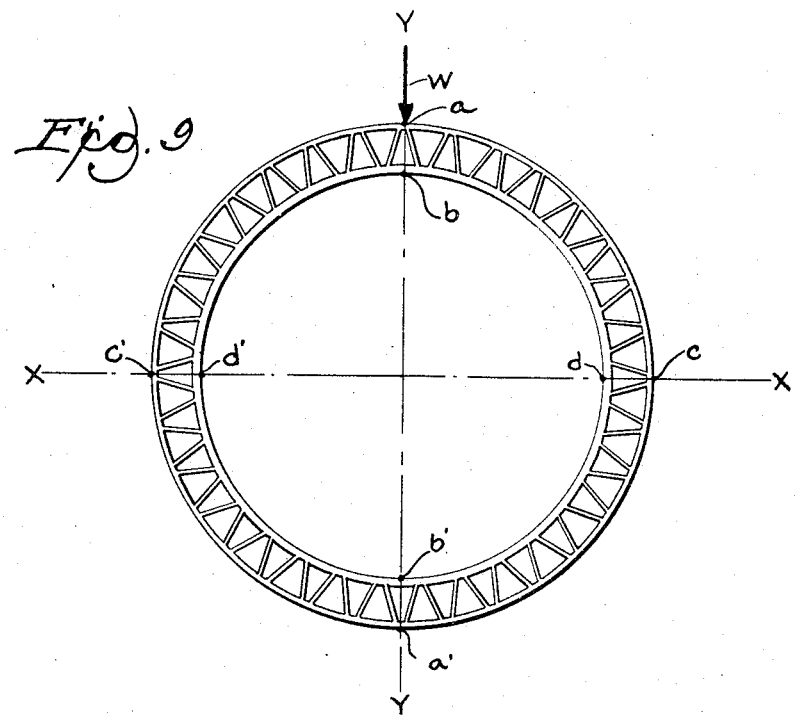
FIGURE 9 is a diagrammatic view in transverse section of the conduit shown in FIGURE 1.

When a length of double-walled conduit is subjected to crushing forces, circumferential stresses are induced in the tubes. Referring to FIGURE 9, the maximum stress occurs at points $a$, $a'$, $b$, $b'$ along the vertical axis. A secondary but lower stress maximum also occurs at $c$, $c'$, $d$ and $d'$ along the horizontal axis. Between these points along both inner and outer walls the stresses are at reduced levels.

It will be observed that the load W acts to reduce the curvature of the tubes near the vertical axis and to increase the curvature near the horizontal axis. Hence, the stresses in the inner wall at $b$, $b'$ and in the outer wall at $c$, $c'$ will be tension stresses, while there will be compression stresses in the outer wall at $a$, $a'$ and the inner wall at $d$, $d'$.

In a given conduit, the maximum tension in the inner wall at $b$, $b'$ may be greater than the maximum tension in the outer wall at $c$, $c'$ by the ratio of, for example, 1.75 to 1. If a longitudinal section of our double-walled pipe is considered, the neutral axis $n$ would be midway between the inner and outer walls if the two walls were of equal thickness. When the inner wall is heavier (see FIGURES 9 and 11), the combined thickness of the inner and outer walls remaining unchanged, the neutral axis moves toward the heavier wall.

Figure 11:
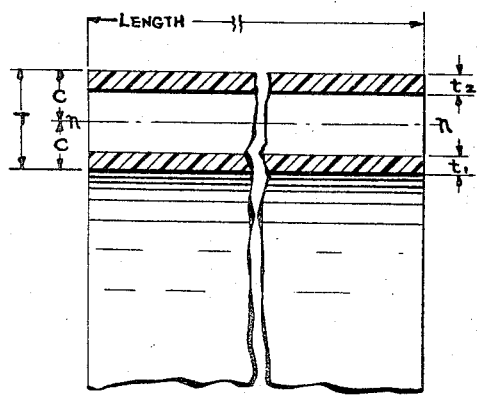
FIGURE 11 is a view similar to FIGURE 10 showing in axial section a form of conduit modified from that of FIGURE 9.
Figure 10:
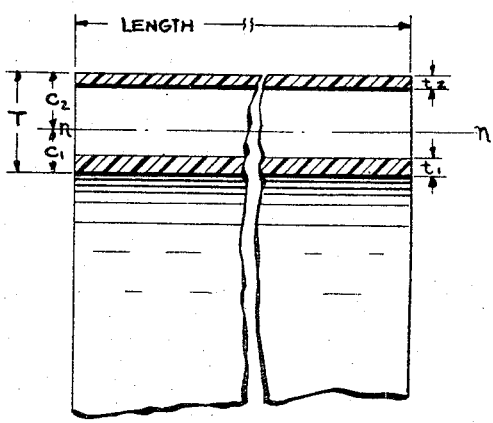
FIGURE 10 is a fragmentary diagrammatic detail view taken in axial section through the conduit shown in FIGURES 1 and 9.

FIGURE 10 is a diagram in which the inner wall $t_1$ and the outer wall $t_2$ are shown for purposes of comparison as being equal in thickness. FIGURE 11 shows the preferred construction in which the combined thickness remains the same but the mass has been redistributed so that the inner wall $t_1$ is now greater in thickness than the outer wall $t_2$.

Assuming a given amount of material is to be used, the shift of wall material from the outer to the inner wall reduces the stresses in the inner wall and increases them in the outer wall. Referring again to FIGURE 9, if the inner wall is made 1.75 times the thickness of the outer wall, the tensile stresses at $b$, $b'$ and at $c$, $c'$ will be equal. Since this eliminates the excess of load imposed on the inner wall at $b$, $b'$ when the walls are of equal thickness, the conduit will now withstand heavier loading before it fails. The gain in the strength of the conduit will have been achieved by an amount equal to the reduction of the stress at $b$, $b'$ in a conduit employing the same quantity of wall material. The compression stress at $a$, $a'$ has, of course, been increased and, whether or not failure occurs, depends on the ratio of compression to tensile strength of the wall material and, if a filler is employed, on what portion of the compression stress is carried by the filler.

The ratio by which the compression strength exceeds the tensile strength may not always be as high as 1.75 to 1. If the material used for the tubes has a ratio of compression to tensile strengths less than 1.75/1, and if no filler (or a filler of negligible strength) is used in the spaces between the inner and outer tube walls, then it would be considered optimum to make the ratio of inner to outer wall thicknesses equal to the ratio of compression to tensile strengths of the tube wall material.

If filler is used between the tubes and regardless of whether it is bonded to the walls, it will carry some portion of the compression stress. The portion so carried will depend on the relative elastic modulii and strengths of the filler and the wall material. Thus, when filler of significant strength and stiffness is used, it may be considered optimum to employ a ratio of inner to outer wall thickness greater than the ratio of compressive to tensile strength of the wall material.

Even if the filler has low compressive strength (100 p.s.i., for example) the transverse strength of the conduit is dramatically increased by the use thereof.

While the foregoing explanation has shown how an optimum ratio of wall thicknesses may be determined, it must be apparent that for any material having an ultimate compressive strength higher than its tensile strength, or if a filler is used which carries a portion of the compressive stress, any increase in thickness of the inner wall in relation to the thickness of the outer wall will produce a stronger conduit for the same amount of wall material used. These considerations are deemed to apply from a ratio of 1.05/1 up to about 4.0/1.

In fabricating conduit in accordance with this invention, the stiffness thereof may readily be controlled. When a length of tube elastic material is subjected to crushing forces the reduction in vertical diameter is given by the formula $$\Delta x = .149 \frac{Wr^3}{EI} \quad (1)*$$

where $\Delta x$ = reduction of the diameter of the conduit in inches.
W = vertical load on the conduit in pounds per linear inch.
E = modulus of elasticity in flexure of the conduit material in pounds per sq. in.
I = moment of inertia of a unit length of the cross section of the conduit wall, in inches$^4$, per inch of length.
r = mean radius of the conduit in inches.

Now if the stiffness of the conduit equals the load per unit length of the tube in lbs./inch required to produce a deflection of one inch, then Stiffness $$S = \frac{W}{\Delta x} = 6.7 \frac{EI}{r^3} \text{ lbs./in.}^2 \quad (2)$$

Or for a homogeneous wall tube when per unit length $$I = \frac{h^3}{12} \text{ inches}^4/\text{inch}$$

then $$S = .558 \frac{Eh^3}{r^3} \text{ lbs./in.}^2 \quad (3)$$

where $h$ = tube wall thickness in inches. Note that in Equation 3 both the wall thickness $h$ and the conduit radius $r$ appear to the third power. Thus, two different diameters of conduits made of the same material will have the same stiffness if the ratio of wall thickness to radius is kept the same. It is also true that two conduits of the same material, of any structural form such as the conduit of this invention, will have the same stiffness if all dimensions are changed in the same ratio as the change in radius.

An example of a conduit constructed in accordance with this invention and having the requisite stiffness is set forth hereinafter. The example describes a conduit having a nominal diameter of eight inches. From the discussion in the preceding paragraph, it should be apparent that the size of the conduit in the example may be varied without altering the stiffness, and therefore, without departing from the spirit of the invention. When fabricating a conduit of like strength and material but of larger or smaller diameter than that set forth in the example, it is necessary only to increase or decrease the dimensions of each element of the conduit, including the inner and outer walls, webs (if any) and filler, in the same ratio as the ratio of increase or decrease of diameter of the conduit. In this manner, the same stiffness can be imparted to different diameters of conduit made of the same materials.

On the other hand, it may be desired to vary the stiffness of the conduit of the example somewhat independently of the strength thereof. When small increases are made in the web thickness of embodiments having webs, all other dimensions being held constant, there will be an increase in stiffness but not strength, unless the other parts are so dimensioned that the webs will break first. Also, stiffness may be decreased in like manner by decreasing the web thickness. Yet another technique to increase or decrease stiffness is to increase or decrease the major (overall) wall thickness of the conduit while holding the thicknesses of the elemental walls (inner and outer tubes and webs, if any) constant. In those embodiments in which filler is employed, conduit stiffness may also be adjusted by substituting fillers of different material or by altering the density or other property of a given filler material to obtain a variation in the modulus and unit strength of the filler.

Then again, it may be desired to produce a conduit

* Roark, Formulas for Stress and Strain, p. 156.

similar to that shown in the example by substituting other synthetic resinous materials in the inner and outer walls, and webs, if any, which substituted materials may differ in physical properties from the material set forth in the example. Lower flexural modulus and/or higher tensile strength in the substituted resinous material may be compensated for by increasing the major wall thickness and decreasing the elemental wall thickness. On the other hand, a higher flexural modulus and/or lower tensile strength in the substituted synthetic resinous material of construction may be compensated by decreasing the major wall thickness and increasing the elemental wall thickness of the conduit.

The comments which follow may be found helpful in producing conduit of optimum performance in accordance with the invention. First of all, it should be understood that the optimum form of the conduit of the invention should have all segments of the elemental walls as equally stressed as possible for best efficiency in the utilization of materials of construction. Also, when fabricating conduits of varying strength, but all having the same design limit insofar as deflection is concerned, i.e. 10%, it has been found beneficial to maintain a certain ratio between stiffness and strength. Where the deflection lag factor and the bedding constant of the soil may be considered as having the values of about 1.0 and 0.1 respectively, the optimum value of the stiffness/strength ratio of the conduit is 10:1. A preferred range for this value is from about 5:1 to about 20:1.

Figure 12:
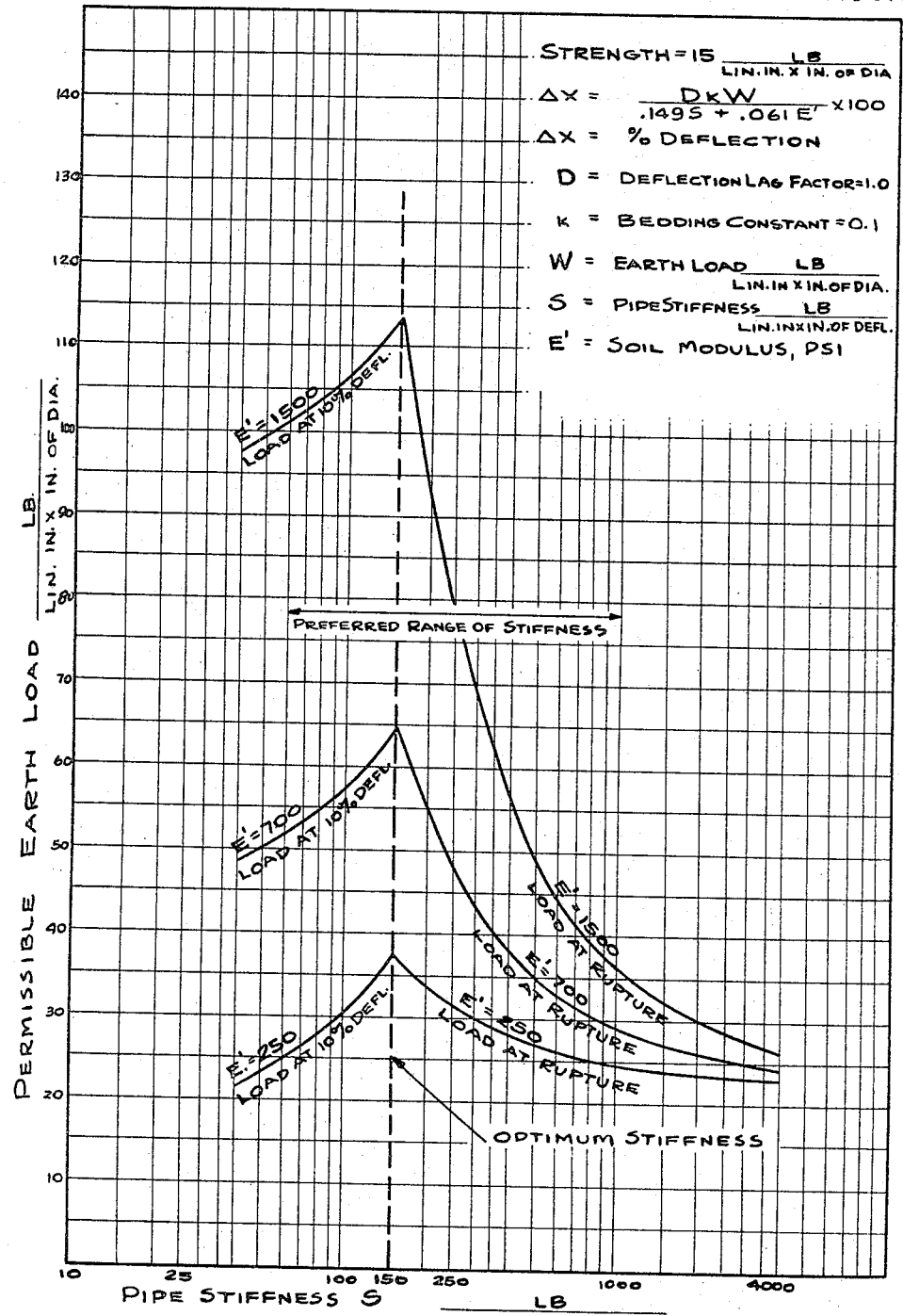
FIGURE 12 is a chart showing the effect of various design parameters upon the performance of an improved double walled conduit at one particular level of strength.
Figure 13:
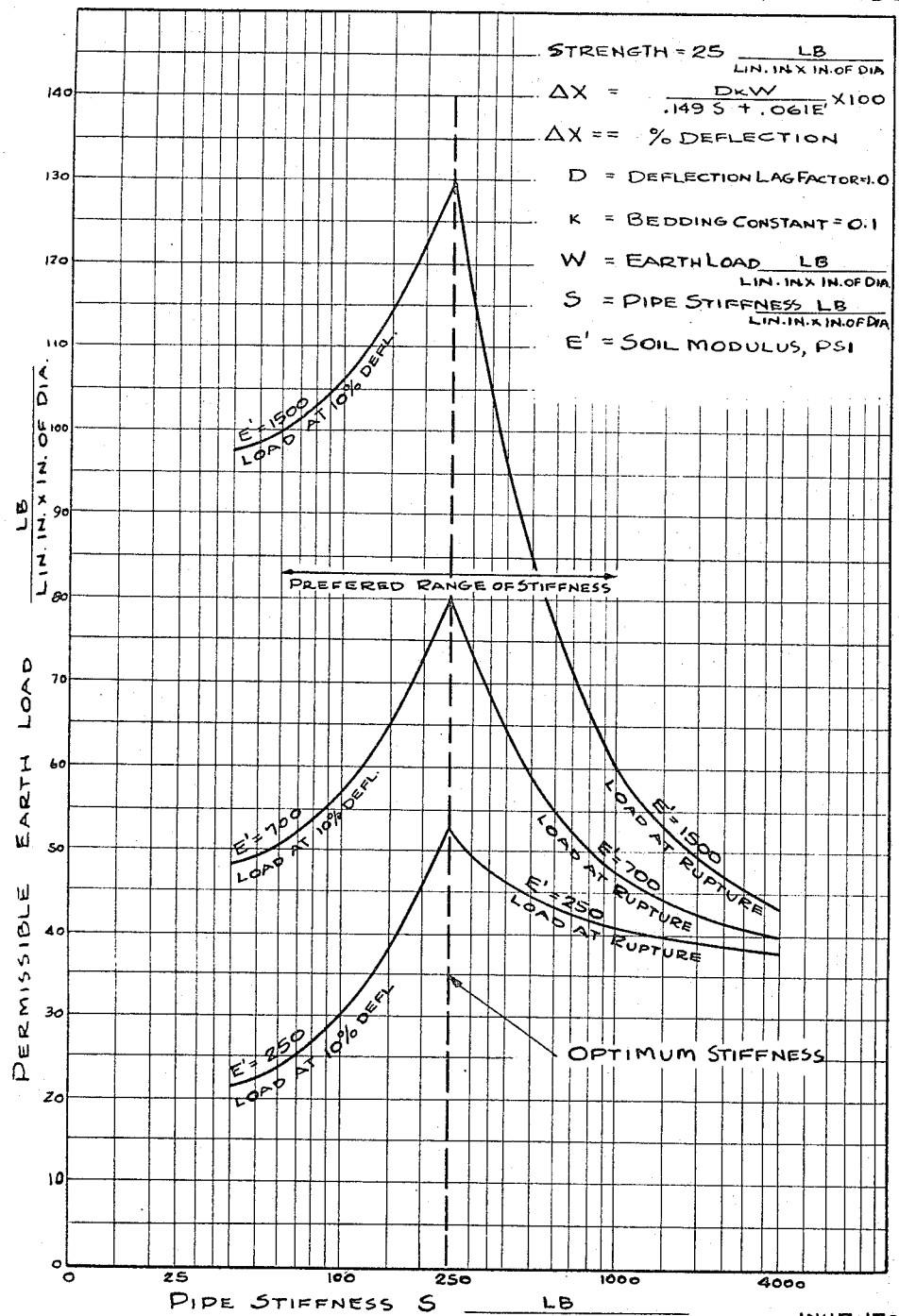

Evidence of the unprecedented properties of the conduit of this invention is illustrated by FIGURES 12 and 13 and their supporting computations. FIGURE 12 represents the load-bearing ability of hypothetical conduits which have a fixed strength of 15 lbs. per lineal inch, per inch of diameter and a variable stiffness of from 40 lbs./in./in. to 4,000 lbs./in./in. FIGURE 13 is a similar plot of conduits possessing strengths of 25 lbs./in./in., and stiffness variable over the same range.

Permissible load is that load which will either cause 10 percent deflection or sufficient deflection to rupture the conduit, whichever is less. Cases involving soils of three different modulii are shown. The computations employ the following simplifying assumptions: Deflection lag factor, 1.0; bedding constant, 0.1; linear stress-strain relationship to point of failure, and deflection at failure corresponding to the parallel plate loading case. A different choice of assumptions would alter the specific position and shape of the curves but not the following general conclusions which may be drawn:

(1) For conduits of a given strength classification, there is an apparent optimum stiffness. Conduits at or near this stiffness posses subtantially greater load-bearing ability than conduits of either lesser or greater stiffness but of equal strength.

(2) This optimum stiffness is that value where structural failure and failure due to excessive deflection coincide.

(3) With conduits of strength levels presently employed in underground gravity sewer service, the optimum stiffness value is such that .149 of stiffness is of the same order of magnitude as .061 of soil modulus when typical design values are used.

As clearly shown in FIGURES 12 and 13, in each of which the three different curves illustrated represent three different conditions of installation, a conduit having stiffness within the indicated range will provide maximum strength in relation to material used regardless of the conditions of installation. This contrasts sharply with previously known pipe constructions in which all typical rigid pipes have a range entirely offset at the right of the curve shown, while most typical flexible pipes have a range offset at the left of those shown, thus heretofore requiring the operator to select one pipe or the other for any given conditions of installation of underground conduit of substantial diameter.

The example which follows set forth a specific embodiment of the invention which provides properties of longitudinal flexibility, strength and transverse stiffness, as above described. It should be understood that the purpose of the example is to illustrate, not limit, the invention.

EXAMPLE

Granular, thermoplastic extrusion grade ABS (Type 4, Grade 1, A.S.T.MM. D-1788-62T) rated at a tensile strength of at least about 5500 p.s.i.[1], a flexural modulus of at least about 290,000, e.g. 350,000, pounds per inch per inch [1], a minimum heat distortion temperature of at least about 180° F., e.g. about 205° F.[2], and impact resistance of at least about 1.5 foot-pounds per pinch, Izod [3], is forced at conventional temperature and pressure through the breaker plate, screen pack and die of a conventional 4½" single-screw extruder fitted with a die adapted to produce the cross-section shown in FIGURE 9. The extruded product is drawn over a mandrel and into a vacuum ring to prevent collapse, cooling being applied by water circulation in the mandrel and ring, is gripped by a puller and drawn away from the die at an accelerated rate according to conventional practice and is cut into suitable lengths, e.g. 8' to 12' and longer. In cross-section, the pipe has the following dimensions: inner wall thickness 0.084" avg. (0.080" min.); outer wall thickness 0.042" avg. (0.040" min.); inside diameter 7⅞" (70° F.); outside diameter by circumferential belt 9.4" (70° F.); number of webs 64; web thickness 0.022" min.; space between adjoining webs at (a) inner wall—0.060" and (b) outer wall—0.080". The conduit has a weight of about 2.3 pounds per foot.

A porous cementious grout or fill of relatively low cost and of substantial potential shear strength but of lower potential modulus and unit strength than the ABS is prepared from the following recipe: Perlite, industrial grade 2; asbestos, short length fibers, Carey Mfg. Co., grade 7RF9, one pound per cu. ft. perlite; portland cement, high early strength type No. 3, 35 pounds per cu. ft. perlite; Water, 35 pounds per cu. ft. perlite; Hercules resin size 249 (entraining agent—60% total solids content neutralized KOH soap of dark wood resins containing 7% excess caustic potash and high-boiling solubilizing alcohol) one fluid oz. per cu. ft. perlite; and sufficient air to produce in the resultant product a wet density of no more than about 50 pounds per cubic foot of fill. The fill may be prepared in any conventional air-entraining mixer.

The resultant pumpable fill is pumped into the cells between the webs in the extruded product under pressure until the cells are substantially completely filled. Thereafter the conduit is laid aside and guarded against dropping and severe stresses for several days, e.g. 3-4 days, during which time it cures. The cured pipe weighs about 8 pounds per lineal foot, has an average strength of about 25 pounds per lineal inch per inch of diameter, and an average stiffness of about 250 pounds per lineal inch per inch of reduction in mean diameter when deflected between parallel plates.

What is claimed is:

1. A plastic double-walled conduit capable of withstanding transverse crushing forces and deflection stresses such as those encountered in underground use thereof, said conduit comprising generally concentric spaced apart inner and outer tubes of synthetic resinous material having a flexural modulus in the range of about 50,000 to about 2,000,000 lbs. per in.², and spacing and bracing means comprising generally longitudinally extending webs formed integrally with both tubes and extending therebetween at peripherally spaced intervals, some of said webs having clockwise inclination and other of said webs having counterclockwise inclination for resisting relative radial and angular movement of said tubes, said conduit having the property of stiffness in the range of about 60 lbs. per inch per inch to about 1,000 lbs. per inch per inch.

2. Conduit in accordance with claim 1 wherein said webs have greater strength in compression than in flexure and the spaced intervals therebetween define cells, said cells being substantially completely filled with filler of substantial compressive strength for resisting flexing of said webs.

3. Conduit according to claim 2 wherein said filler is coherent porous cementious material.

4. Conduit according to claim 1 wherein said synthetic resinous material has greater strength in compression than in tension and the inner of said tubes is thicker than the outer of said tubes in a ratio of about 1.05 to 1 to about 4.0 to 1.

5. Conduit according to claim 1 wherein said webs are alternately inclined in a truss-like, zigzag arrangement.

6. Conduit according to claim 1 wherein said synthetic resinous material is polymeric material of acrylonitrile, butadiene and styrene having a tensile strength of at least about 5,500 p.s.i., and impact resistance of at least about 1.5 foot-pounds per inch, Izod.

7. A conduit capable of withstanding deflection and crushing forces when buried in the earth, said conduit comprising spaced inner and outer tubes of synthetic resinous material that has greater strength in compression than in tension, the inner of said tubes being thicker than the outer of said tubes in a ratio of about 1.05 to 1 to about 4.0 to 1, and spacing and bracing means between said tubes and extending substantially throughout the length thereof, for resisting both radial and localized angular displacement of each of the tubes with respect to the other.

8. Conduit according to claim 7 wherein said spacing and bracing means comprises circumferentially-spaced webs integrally connected with both of said tubes.

9. Conduit in accordance with claim 8 wherein substantially all of the space between said webs is filled with a coherent solid filler of substantial compressive strength.

10. Conduit in accordance with claim 8 wherein said webs are alternately inclined in a truss-like, zigzag arrangement.

11. A plastic double-walled conduit capable of withstanding transverse crushing forces and deflection stresses such as those encountered in underground use thereof, said conduit comprising generally concentric spaced-apart inner and outer tubes of synthetic resinous material having a flexural modulus in the range of about 50,000 to about 2,000,000 lbs. per in.², and spacing and bracing means connected with both tubes for resisting relative radial and angular movement of said tubes, wherein said spacing and bracing means comprises a plurality of circumferentially distributed strut members extending from each of said tubes toward the other of said tubes and longitudinally of said conduit in the space therebetween, at least some of said strut members being integral with one only of said tubes and other of said strut members being integral only with the other of said tubes; and coherent filler filling substantially all space between said struts and between said tubes, said filler being of material that has substantial compressive strength but substantially lower unit strength and elastic modulus in flexure than said synthetic resinous material; said conduit having stiffness in the range of about 60 lbs. per inch per inch to about 1,000 lbs. per inch per inch.

12. A plastic double-walled conduit capable of withstanding transverse crushing forces and deflection stresses such as those encountered in underground use thereof, said conduit comprising generally concentric spaced apart inner and outer tubes of synthetic resinous material having a flexural modulus in the range of about 50,000 to about 2,000,000 lbs./in.², and spacing and bracing means, in-

---

[1] Data on 0.115" extruded sheet at 73° F.
[2] Unannealed ½" x ½" injection molded bars, 264 p.s.i.
[3] Izod Notch Test on ½" x ½" injection-molded bars, 0.010" notch radius, at 73° F.

cluding a cellular solid fill material which is at least relatively rigid, for resisting relative radial and angular movement of said tubes, said conduit having stiffness in the range of about 60 lbs. per inch per inch to about 1,000 lbs. per inch per inch.

13. Conduit in accordance with claim 12 wherein said cellular solid fill is a material which, under conditions of incorporation in the conduit, is pumpable.

14. Conduit in accordance with claim 12 in combination with a trench and earth fill, said conduit being disposed in said trench and covered by said fill.

15. In a conduit comprising generally concentric spaced apart inner and outer tubes of synthetic resinous material, webs integral with said tubes, extending generally longitudinally and distributed all around between said tubes at circumferentially spaced intervals for resisting radial and angular displacement of the tubes relative to one another, and a cellular solid fill material which fills substantially all of the space between said tubes and webs, the improvement characterized in that the synthetic resinous material has a flexural modulus in the range of about 50,000 to about 2,000,000 lbs./in.$^2$, the fill is at least relatively rigid for effectively resisting deflection of said webs and for coacting with said webs for bracing the conduit structure against angular displacement of said tubes, and the conduit is formed such that the conduit as a whole has a stiffness of about 60 lbs. per inch per inch per inch to about 1,000 lbs. per inch per inch.

16. Conduit in accordance with claim 15 wherein certain of said webs are connected with both of said tubes and extend radially between them.

17. Conduit in accordance with claim 15 wherein certain of said webs are alternately inclined in a truss-like, zig-zag arrangement.

18. Conduit in accordance with claim 15 in which said inner tube is thicker than said outer tube in a ratio in the range of about 1.05 to 1 to about 4 to 1.

19. Conduit in accordance with claim 15 in which said cellular solid fill material is a porous cementious material.

20. Conduit in accordance with claim 15 wherein certain said webs are formed integrally with both of said tubes and have a clock-wise inclination with respect to radii drawn between said tubes and other of said webs are formed integrally with both of said tubes and have a counterclockwise inclination with respect to radii drawn between said tubes, said fill material has material shear strength and said inner tube is thicker than said outer tube in a ratio of about 1.05 to 1 to about 4 to 1.

References Cited

UNITED STATES PATENTS

| | | | |
|---|---|---|---|
| 353,680 | 12/1886 | Hurlbut | 138—114 |
| 1,677,714 | 7/1928 | Frease | 138—148 |
| 2,243,273 | 5/1941 | Edwards | 138—153 |
| 2,991,808 | 7/1961 | Siegmann et al. | 138—141 |
| 3,042,080 | 7/1962 | Dosker | 138—149 X |
| 3,167,204 | 1/1965 | Rouse | 138—148 X |

FOREIGN PATENTS

| | | |
|---|---|---|
| 113,689 | 3/1917 | Great Britain. |

OTHER REFERENCES

Bericht Nr. 35 des Schweizerischen Verbandes für die Materialprüfungen der Techik, July 1937, copy in 138/105.

LAVERNE D. GEIGER, *Primary Examiner.*

C. L. HOUCK, *Assistant Examiner.*